(12) United States Patent
Takase et al.

(10) Patent No.: US 11,878,366 B2
(45) Date of Patent: Jan. 23, 2024

(54) LASER PROCESSING HEAD AND LASER PROCESSING MACHINE

(71) Applicant: AMADA CO., LTD., Kanagawa (JP)

(72) Inventors: Yasuhiro Takase, Kanagawa (JP); Akihiko Sugiyama, Kanagawa (JP); Chisato Udagawa, Kanagawa (JP)

(73) Assignee: AMADA CO., LTD., Kanagawa (JP)

(*) Notice: Subject to any disclaimer, the term of this patent is extended or adjusted under 35 U.S.C. 154(b) by 113 days.

(21) Appl. No.: 17/608,670

(22) PCT Filed: Apr. 27, 2020

(86) PCT No.: PCT/JP2020/017966
§ 371 (c)(1),
(2) Date: Nov. 3, 2021

(87) PCT Pub. No.: WO2020/226089
PCT Pub. Date: Nov. 12, 2020

(65) Prior Publication Data
US 2022/0226930 A1  Jul. 21, 2022

(30) Foreign Application Priority Data

May 7, 2019  (JP) .................................. 2019-087349

(51) Int. Cl.
*B23K 26/035*   (2014.01)
*B23K 26/14*    (2014.01)

(52) U.S. Cl.
CPC ........ *B23K 26/035* (2015.10); *B23K 26/1462* (2015.10)

(58) Field of Classification Search
CPC ................ B23K 26/38; B23K 26/1462; B23K 26/0884; B23K 26/14; B23K 37/0408; B23K 37/0235
See application file for complete search history.

(56) References Cited

U.S. PATENT DOCUMENTS 5,418,350 A * 5/1995 Freneaux ............. B23K 26/144
                                                   219/121.84
5,609,781 A   3/1997 Kaga et al.
(Continued)

FOREIGN PATENT DOCUMENTS

JP   S62-187589      8/1987
JP   06-066883 U     9/1994
(Continued)

OTHER PUBLICATIONS

International Search Report for corresponding Application No. PCT/JP2020/017966, dated Jul. 14, 2020.
(Continued)

*Primary Examiner* — Thien S Tran
(74) *Attorney, Agent, or Firm* — Renner, Otto, Boisselle & Sklar, LLP

(57) ABSTRACT

A laser processing head includes a tubular main body, and a gas supply part disposed in the main body and allowing an assist gas supplied from outside to flow into an internal space of the main body. The gas supply part includes a first gas supply hole extending along a first axis on a plane orthogonal to an axis of a tube of the main body and opening at an inner circumferential surface of the main body, a second gas supply hole forming a predetermined angle relative to the first axis around the axis, extending along a second axis on the plane orthogonal to the axis and opening at the inner circumferential surface, and a flow path forming ring facing the inner circumferential surface with a predetermined interval, and forming a cylindrical space extending along the axis between the flow path forming ring and the inner circumferential surface.

5 Claims, 14 Drawing Sheets

(56) References Cited

U.S. PATENT DOCUMENTS

2019/0247960 A1* 8/2019 Mienhardt ................ B26F 1/38
2020/0361032 A1* 11/2020 Opitz ................... B23K 26/142

FOREIGN PATENT DOCUMENTS

| JP | 10180477 A | * | 7/1998 | | |
|---|---|---|---|---|---|
| JP | 2015-62934 A | | 4/2015 | | |
| JP | 2017-170477 A | | 9/2017 | | |
| WO | WO-2018073215 A2 | * | 4/2018 | .......... | B23K 26/032 |
| WO | WO-2019149819 A1 | * | 8/2019 | .......... | B23K 26/142 |

OTHER PUBLICATIONS

Written Opinion for corresponding Application No. PCT/JP2020/017966, dated Jul. 14, 2020.
Written submission of exception certificate for loss of novelty as filed for corresponding Japanese Application No. 2019-087349, submitted Jun. 6, 2019.
Extended European Search Report for corresponding EP Application No. 20802552.8 dated May 19, 2022.

* cited by examiner

Fig. 11
| FOCUS POSITION (mm) | MOVING PATH | MOVING VELOCITY (m/min) | | | |
|---|---|---|---|---|---|
| | | 4.5 | 5.0 | 5.5 | 6.0 |
| -0.5 | Ct1(Y-) | 43 | 34 | 28 | 40 |
| | Ct2(X+) | 45 | 38 | 33 | 38 |
| | Ct3(Y+) | 36 | 39 | 39 | 40 |
| | Ct4(X-) | 33 | 42 | 37 | 35 |
| -2.0 | Ct1(Y-) | 25 | 14 | 18 | 21 |
| | Ct2(X+) | 27 | 18 | 8 | 22 |
| | Ct3(Y+) | 30 | 9 | 16 | 22 |
| | Ct4(X-) | 29 | 12 | 10 | 19 |
| -3.0 | Ct1(Y-) | 20 | 14 | 15 | 25 |
| | Ct2(X+) | 17 | 12 | 20 | 27 |
| | Ct3(Y+) | 15 | 15 | 16 | 27 |
| | Ct4(X-) | 18 | 16 | 17 | 26 |
DROSS HIGHEST VALUE Dd (μm)
 $50 < Dd$
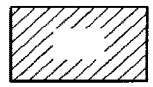 $40 < Dd \leq 50$
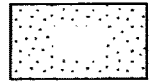 $30 < Dd \leq 40$
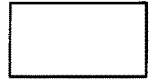 $Dd \leq 30$ Fig. 13
| FOCUS POSITION (mm) | MOVING PATH | MOVING VELOCITY (m/min) | | | |
|---|---|---|---|---|---|
| | | 4.5 | 5.0 | 5.5 | 6.0 |
| -1.5 | Ct1(Y-) | 29 | 33 | 46 | 36 |
| | Ct2(X+) | 38 | 36 | 49 | 42 |
| | Ct3(Y+) | 32 | 30 | 40 | 39 |
| | Ct4(X-) | 35 | 37 | 50 | 42 |
| -2.0 | Ct1(Y-) | 33 | 21 | 25 | 35 |
| | Ct2(X+) | 40 | 28 | 35 | 40 |
| | Ct3(Y+) | 30 | 25 | 27 | 30 |
| | Ct4(X-) | 39 | 30 | 34 | 47 |
| -3.0 | Ct1(Y-) | 35 | 30 | 36 | 32 |
| | Ct2(X+) | 55 | 35 | 44 | 39 |
| | Ct3(Y+) | 40 | 33 | 40 | 33 |
| | Ct4(X-) | 64 | 39 | 42 | 35 |
DROSS HIGHEST VALUE Dd (μm)
 50 < Dd
 40 < Dd ≦ 50
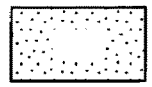 30 < Dd ≦ 40
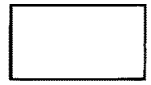 Dd ≦ 30

LASER PROCESSING HEAD AND LASER PROCESSING MACHINE

TECHNICAL FIELD

The present invention relates to a laser processing head and a laser processing machine.

BACKGROUND ART

Patent Literature 1 describes a laser processing machine that performs laser processing by use of an assist gas. The laser processing machine described in Patent Literature 1 includes a supply hole for the assist gas in a side surface of a laser processing head, and the assist gas supplied from external assist gas supply means is introduced from the supply hole into the laser processing head and blown from a nozzle tip.

CITATION LIST

Patent Literature

Patent Literature 1: Japanese Patent Application Laid-Open Publication No. S63-187589

SUMMARY

Usually, a laser processing head is formed in a tubular shape, and a supply hole for an assist gas is provided in a portion of a side surface of the laser processing head. For example, when this laser processing head is moved in an X-axis direction and Y-axis direction that are horizontally orthogonal to cut a plate material, a height of dross generated during cutting in one axial direction might be different from a height of dross generated during cutting in the other axial direction. That is, cutting directionality might be generated in the height of the dross generated in laser cutting, and further improvement in product quality is desired.

Therefore, a problem to be solved by the present invention is to provide a laser processing head and a laser processing machine in which cutting directionality is hard to occur in height of dross and product quality improves in laser processing by use of an assist gas.

To solve the above problem, a laser processing head according to an aspect of the present invention includes a tubular main body, and a gas supply part disposed in the main body and allowing an assist gas supplied from outside to flow into an internal space of the main body. The gas supply part includes a first gas supply hole extending along a first axis on a plane orthogonal to an axis of a tube of the main body and opening at an inner circumferential surface of the main body, a second gas supply hole forming a predetermined angle relative to the first axis around the axis, extending along a second axis on the plane orthogonal to the axis and opening at the inner circumferential surface, and a flow path forming ring facing the inner circumferential surface with a predetermined interval, and forming a cylindrical space extending along the axis between the flow path forming ring and the inner circumferential surface.

BRIEF DESCRIPTION OF DRAWINGS

FIG. 11 is table showing a dross highest value Dd when cutting is performed with the laser processing head 1.

FIG. 13 is a table showing a dross highest value Dd when cutting is performed with the laser processing head 1A.

DESCRIPTION OF EMBODIMENT

A laser processing head according to an embodiment includes a tubular main body, and a gas supply part disposed in the main body and allowing an assist gas supplied from outside to flow into an internal space of the main body. The gas supply part includes a first gas supply hole extending along a first axis on a plane orthogonal to an axis of a tube of the main body and opening at an inner circumferential surface of the main body, a second gas supply hole forming a predetermined angle relative to the first axis around the axis, extending along a second axis on the plane orthogonal to the axis and opening at the inner circumferential surface, and a flow path forming ring facing the inner circumferential surface with a predetermined interval, and forming a cylindrical space extending along the axis between the flow path forming ring and the inner circumferential surface. In the laser processing head according to the embodiment, the predetermined angle may be an angle other than 180°. In the laser processing head according to the embodiment, the gas supply part may include n (n is an integer equal to or more than 3) gas supply holes shifting from each other around the axis, extending along an axis orthogonal to the axis and opening to the cylindrical space, and at least one of the n gas supply holes may have different angle pitches with two adjacent gas supply holes around the axis.

A laser processing machine according to an embodiment includes the laser processing head according to the embodiment, a laser oscillation device configured to supply a laser beam to the laser processing head, an assist gas supply device configured to supply an assist gas to the first gas supply hole and the second gas supply hole, and a moving device configured to move the laser processing head 1 relative to a workpiece. In the laser processing machine according to the embodiment, an assist gas with the same pressure may be supplied to the first gas supply hole and the second gas supply hole.

According to the laser processing head and laser processing machine of the embodiment, cutting directionality is hard to occur and product quality improves in a dross height in laser processing by use of the assist gas.

Figure 1:
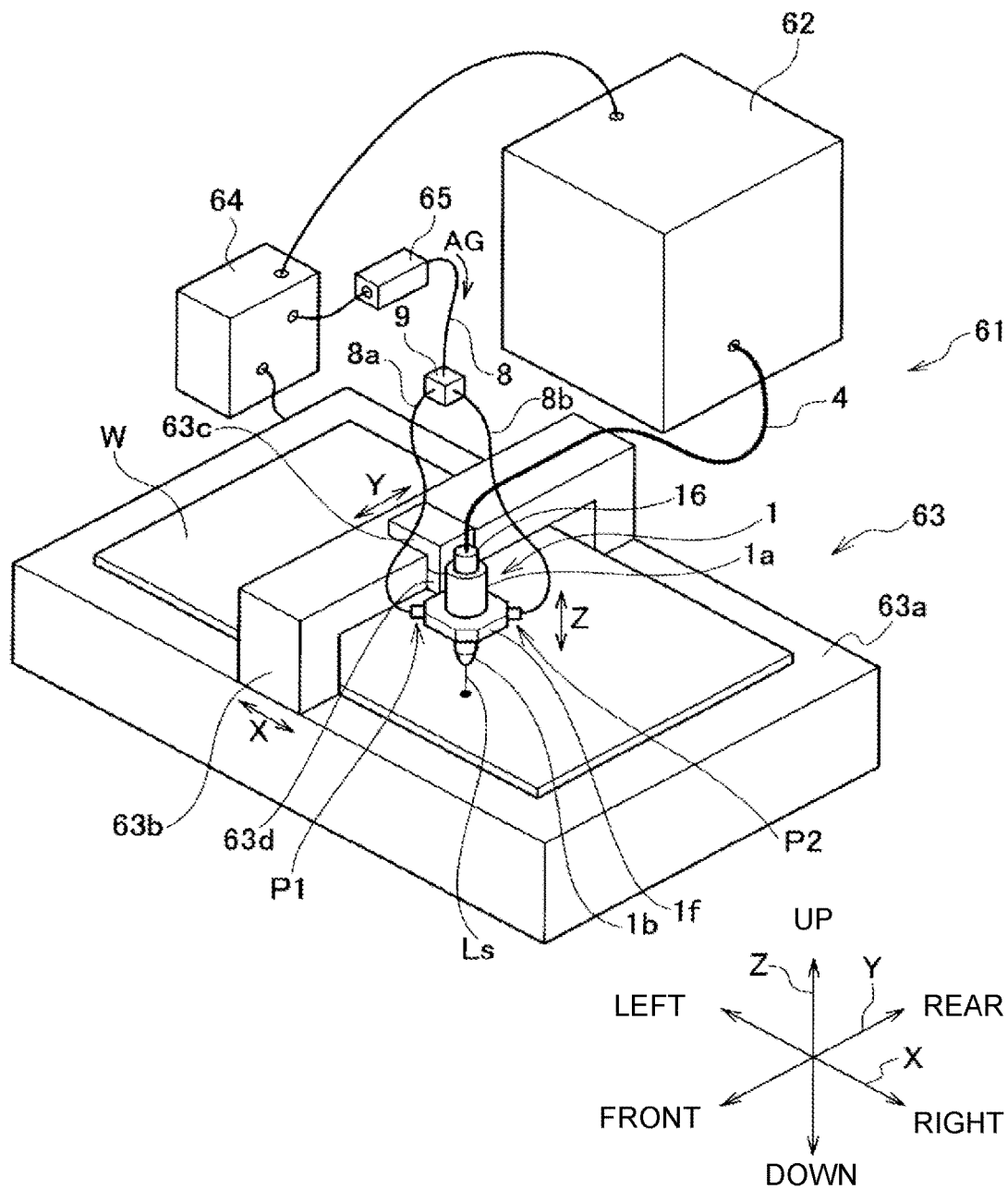
FIG. 1 is a perspective view showing a laser processing machine 61 that is an implementation example of a laser processing machine according to an embodiment of the present invention.

The laser processing head and laser processing machine according to the embodiment of the present invention will be described in accordance with a laser processing head 1 and a laser processing machine 61 as implementation examples. FIG. 1 is a perspective view showing an entire configuration of the laser processing machine 61. Respective directions of up, down, left, right, front and rear in the following description are prescribed by arrow directions shown in FIG. 1.

The laser processing machine 61 irradiates a workpiece W that is a material to be processed with a laser beam Ls, and subjects the workpiece W to processing such cutting or hole making. The laser processing machine 61 includes a laser oscillation device 62, a processing main body 63, an NC device 64, and an assist gas supply device 65.

The laser oscillation device 62 is, for example, a fiber laser oscillation device, and generates the laser beam Ls. The processing main body 63 includes a table 63a supporting the workpiece W, and an X-axis carriage 63b disposed on the table 63a to be movable in an X-axis direction (right-left direction).

The X-axis carriage 63b is provided with a Y-axis carriage 63c movable in a Y-axis direction (front-rear direction) orthogonal to an X-axis on a horizontal plane. The Y-axis carriage 63c is provided with a Z-axis holder 63d. The Z-axis holder 63d supports the laser processing head 1 movably in a Z-axis direction (up-down direction). The X-axis carriage 63b and the Y-axis carriage 63c function as moving devices that relatively move the workpiece W and the laser processing head 1 in the X-axis direction and Y-axis direction, respectively.

A fiber cable 4 is connected between the laser oscillation device 62 and the laser processing head 1. The laser beam Ls generated in the laser oscillation device 62 is supplied via the fiber cable 4 to the laser processing head 1. The assist gas supply device 65 outputs a high purity gas or rich gas such as nitrogen via a hose 8. The hose 8 is branched to a hose 8a of a first gas path and a hose 8b of a second gas path by a branch part 9. The hose 8a is connected to a gas supply port P1 of the laser processing head 1, and the hose 8b is connected to a gas supply port P2 of the laser processing head 1. That is, the assist gas AG is supplied to the laser processing head 1 separately from the respective gas supply port P1 and gas supply port P2.

The processing main body 63 is not limited to the above configuration, if the workpiece W and the laser processing head 1 are relatively movable in the X-axis and Y-axis directions. For example, the X-axis carriage 63b may be fixed so that the laser processing head 1 is movable in the Y-axis and Z-axis directions, and the workpiece W may be moved by an unshown clamper in the X-axis direction.

Figure 2:
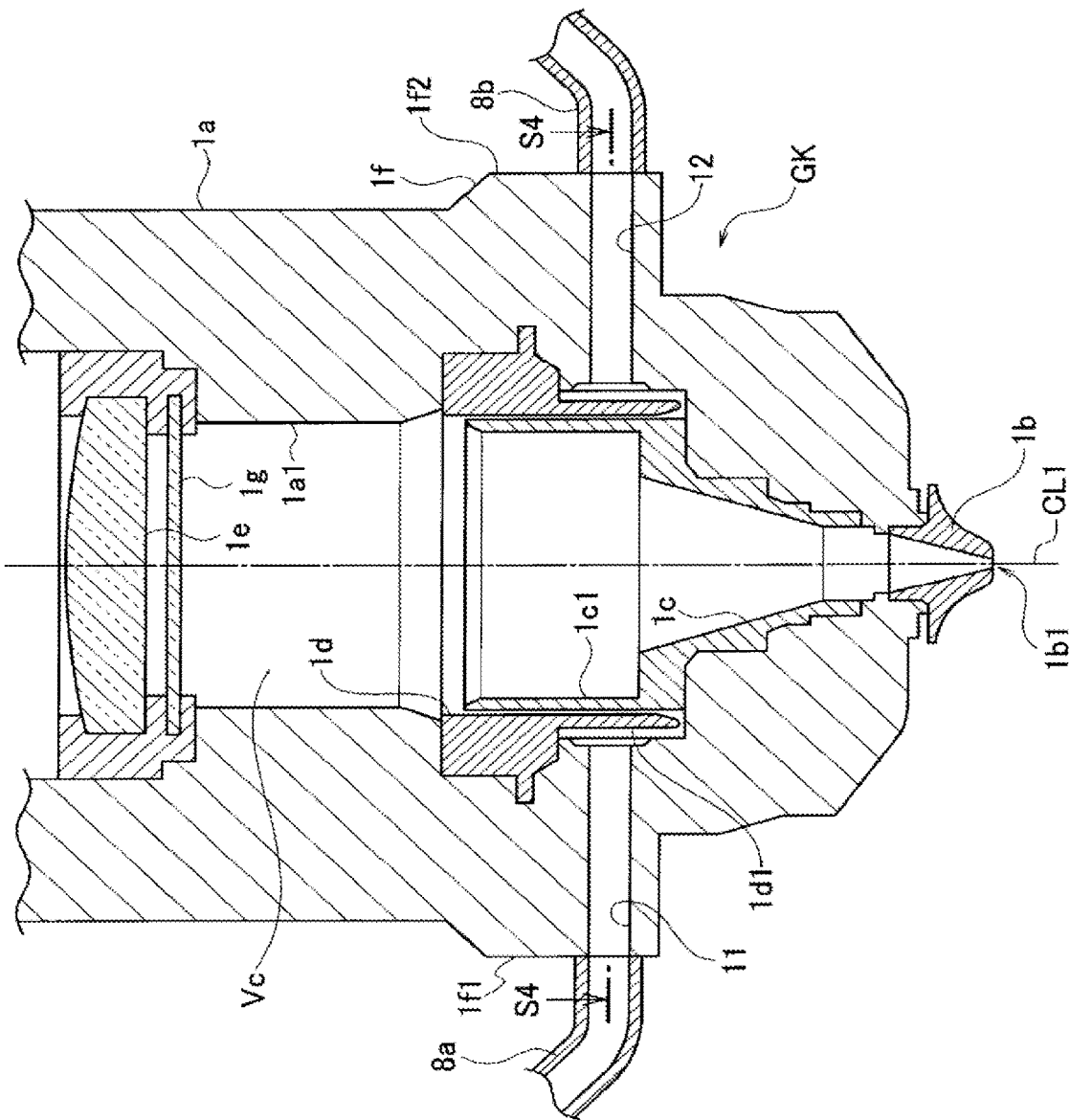
FIG. 2 is a partially sectional view of a laser processing head 1 included in the laser processing machine 61.
Figure 3:
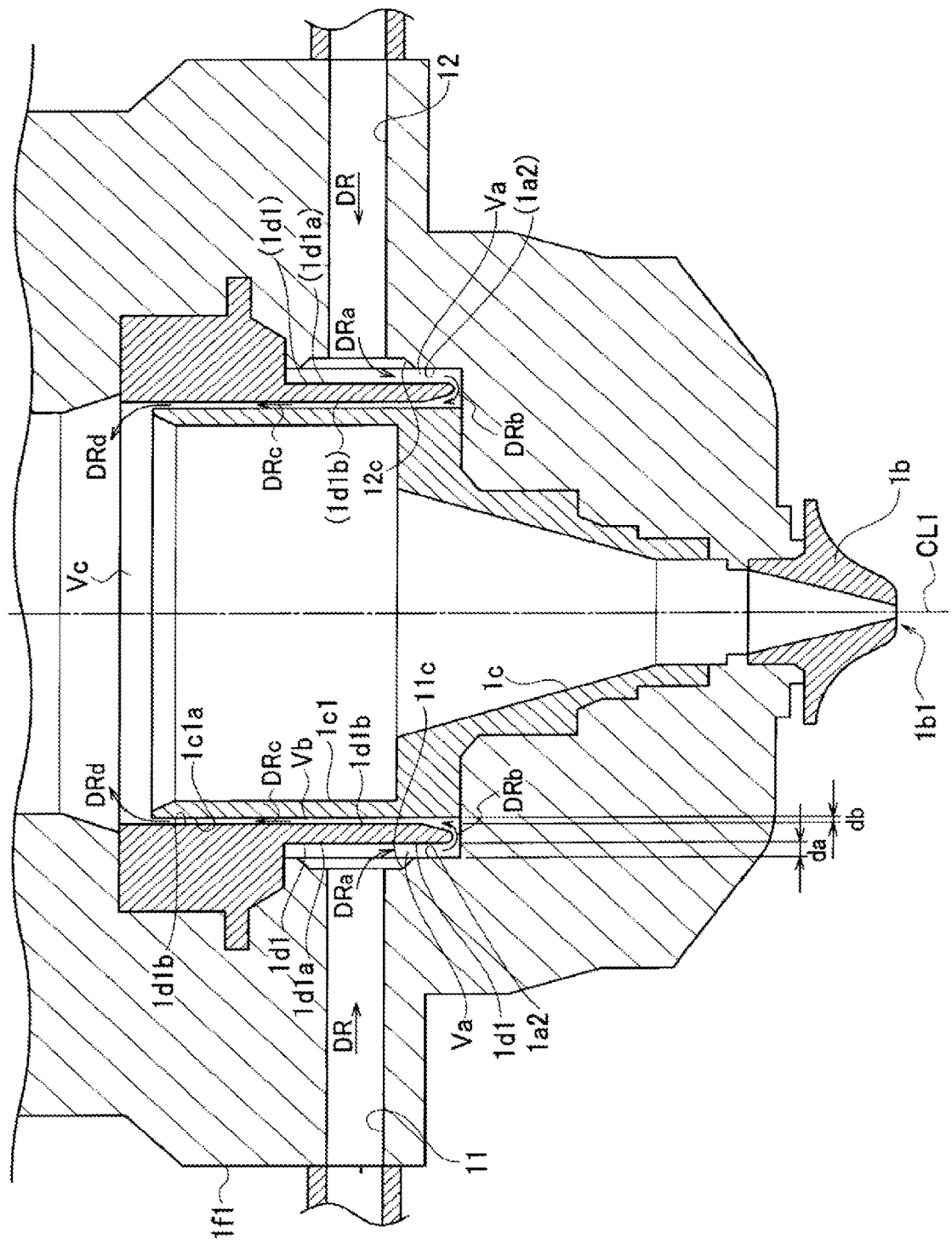
FIG. 3 is a partially enlarged view in FIG. 2.
Figure 4:
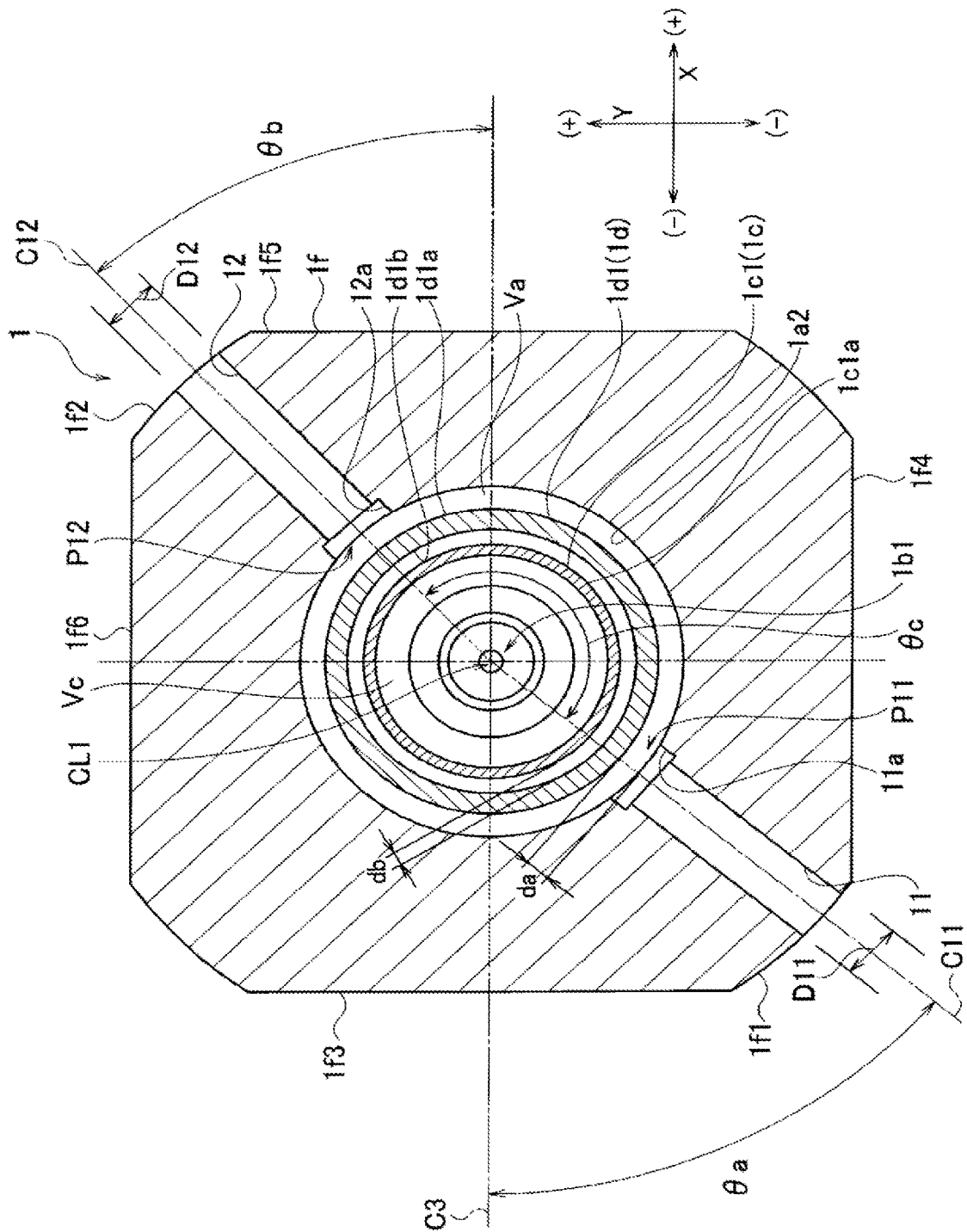
FIG. 4 is a cross-sectional view at a S4-S4 position in FIG. 2.

Next, description will be made as to the laser processing head 1 in detail with reference to FIG. 1 to FIG. 4. FIG. 2 is a vertical sectional view of a lower part in the laser processing head 1, and FIG. 3 is a partially enlarged view of FIG. 2. FIG. 4 is a cross-sectional view at a S4-S4 position in FIG. 2.

The laser processing head 1 includes a tubular main body 1a including a hole 1a1 extending along an axis CL1 and a nozzle 1b detachably attached to a tip of the main body 1a.

In the main body 1a, an unshown collimation lens and a focusing lens 1e and protective glass 1g shown in FIG. 2 are arranged from a side to which the fiber cable 4 is connected on the axis CL1 of the main body 1a that is an optical axis of the laser beam Ls. The main body 1a may be formed in an L-shape with a configuration where a mirror is disposed between the collimation lens and the focusing lens 1e, to reflect the laser beam Ls by 90° with the mirror.

The laser beam Ls that is supplied from the laser oscillation device 62 and incident as a divergent beam from an outlet end face (not shown) of the fiber cable 4 into an internal space of the main body 1a is collimated to a parallel beam by the collimation lens. The laser beam Ls collimated to the parallel beam is focused, for example, as a convergent beam on a focal point of a processed part of the workpiece W by the focusing lens 1e, and emitted out from an opening 1b1 in a tip of the nozzle 1b.

As shown in FIG. 2, the main body 1a includes a flange part 1f protruding outward in a portion between the focusing lens 1e and the nozzle 1b in an axial direction. As shown in FIG. 4, the flange part 1f possesses an outer shape of a cross section that is substantially rectangular, and has four corners formed in a circular-arc shape and the other portions as linear edges 1f3 to 1f6. In a pair of opposite corners 1f1 and 1f2, gas supply holes 11 and 12 are formed opening at an inner circumferential surface 1a2 of the hole 1a1 to communicate with an internal space Vc of the hole 1a1, respectively. The gas supply holes 11 and 12 correspond to the first gas supply hole and the second gas supply hole, respectively, and function as supply paths to introduce the assist gas AG supplied from the outside into the main body 1a.

As shown in FIG. 4, the gas supply hole 11 is a straight circular hole having a predetermined inner diameter D11. An axis C11 corresponding to the first axis forms a predetermined angle θa as an acute angle in a counterclockwise direction in FIG. 4 relative to a center line C3 orthogonal to the axis CL1 and orthogonal to the edges 1f3 and 1f5. Hereinafter, "orthogonal" means "crossing at right angles" unless otherwise noted. The gas supply hole 12 is a straight circular hole having a predetermined inner diameter D12. An axis C12 corresponding to the second axis forms a predetermined angle θb as an acute angle in a counterclockwise direction in FIG. 4 relative to the center line C3 orthogonal to the axis CL1. The angle θa and the angle θb may be the same angle, but are more preferably set to different angles. That is, as shown in FIG. 4, when an obtuse angle formed by the axis C11 and the axis C12 is a predetermined angle θc, the angle θc is more preferably an angle other than 180°. In this case, an example of the angle θa is 50°, and an example of the angle θb is 43°. The gas supply hole 11 and the gas supply hole 12 are formed at the same position in the axial direction in which the axis CL1 extends. That is, the axis C11 and axis C12 are included on the same plane orthogonal to the axis CL1.

An annular flow path forming ring 1d with the axis CL1 being a center axis is attached to a lower part of the main body 1a in the laser processing head 1. The flow path forming ring 1d has a peripheral wall portion 1d1. The peripheral wall portion 1d1 with a bottom as a tip extends in an annular shape, and faces the inner circumferential surface 1a2 of the hole 1a1 with a gap of a predetermined distance da that is a predetermined interval in a radial direction shown in FIG. 2 and FIG. 4. The distance da is constant over an entire circumference, and the gap of the distance da is acquired to form a cylindrical space Va between the inner circumferential surface 1a2 and an outer circumferential surface 1d1a of the peripheral wall portion 1d1.

An annular flow path adapter 1c with the axis CL1 being a center axis is attached to the lower part of the main body 1a. An upper part of the flow path adapter 1c enters inside the flow path forming ring 1d. The flow path adapter 1c has a peripheral wall portion 1c1. The peripheral wall portion 1c1 with a top as a tip extends in an annular shape, and faces an inner circumferential surface 1d1b of the flow path forming ring 1d with a gap of a predetermined distance db in the radial direction shown in FIG. 2 and FIG. 4. The distance db is constant over the entire circumference, and the gap of the distance db is acquired to form a cylindrical space Vb between the inner circumferential surface 1d1b of the flow path forming ring 1d and an outer circumferential surface 1c1a of the peripheral wall portion 1c1.

As shown in FIG. 2, the laser processing head 1 includes the gas supply hole 11 and the gas supply hole 12, and the flow path forming ring 1d and the flow path adapter 1c, as a gas supply part GK that supplies the assist gas AG from the outside into the internal space Vc of the main body 1a. Consequently, as shown with arrows DR in FIG. 3, the assist gas AG is supplied from the outside through the gas supply hole 11 and the gas supply hole 12 with the same pressure and flow rate, and flows into the space Va with a width in the radial direction that is the distance da as shown with arrows DRa. The space Va communicates with the space Vb on a side of a lower end portion of the peripheral wall portion 1d1 of the flow path forming ring 1d, and the assist gas AG flowing into the space Va passes through the lower end portion of the peripheral wall portion 1d1 to flow into the space Vb with a width in the radial direction that is the distance db as shown with arrows DRb. The space Vb has an upper end side that opens into the hole 1a1, and hence the assist gas AG flowing into the space Vb from a lower part side flows upward as shown with arrows DRc to flow from an upper end portion of the space Vb into the internal space Vc of the hole 1a1 as shown with arrows DRd.

Figure 5:
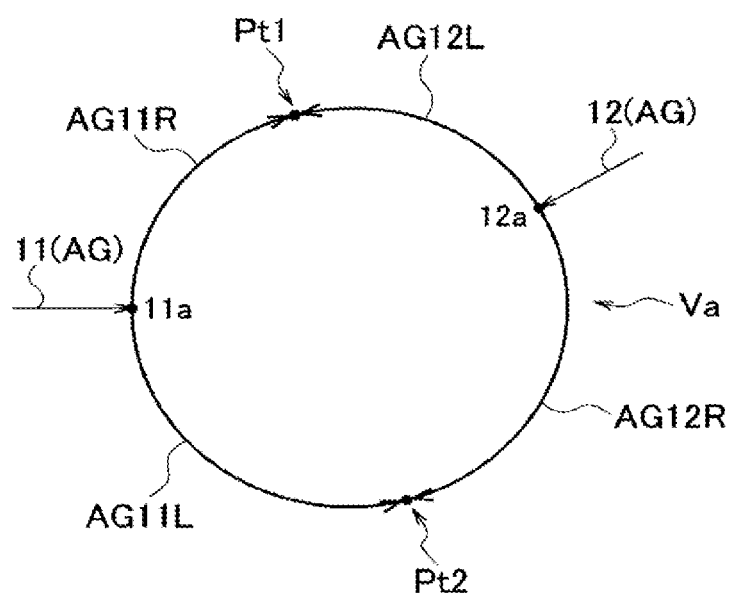
FIG. 5 is a schematic view showing flow of an assist gas AG supplied to the laser processing head 1.

FIG. 5 is a schematic plan view showing flow of the assist gas AG with arrows, which is supplied to the space Va through the gas supply holes 11 and 12 in the laser processing head 1, and showing the space Va with a circle.

As shown in FIG. 5, when the assist gas AG supplied from the gas supply hole 11 flows into the space Va, the flow branches to gas flow AG11R that is clockwise flow and gas flow AG11L that is counterclockwise flow. On the other hand, when the assist gas AG supplied from the gas supply hole 12 flows into the space Va, the flow branches to gas flow AG12R that is clockwise flow and gas flow AG12L that is counterclockwise flow.

The space Va is modelled as a closed circular shape on a cross section orthogonal to the axis CL1, and hence the gas flow AG11R and gas flow AG12L collide at a collision point Pt1 that is a midpoint on an upper circular arc of FIG. 5 where flow distances from inflow points 11a and 12a into the space Va in a circumferential direction are about the same. On the other hand, the gas flow AG11L and gas flow AG12R collide at a collision point Pt2 that is a midpoint on a lower circular arc of FIG. 5 where flow distances from the inflow points 11a and 12a in the circumferential direction are about the same.

Figure 6:
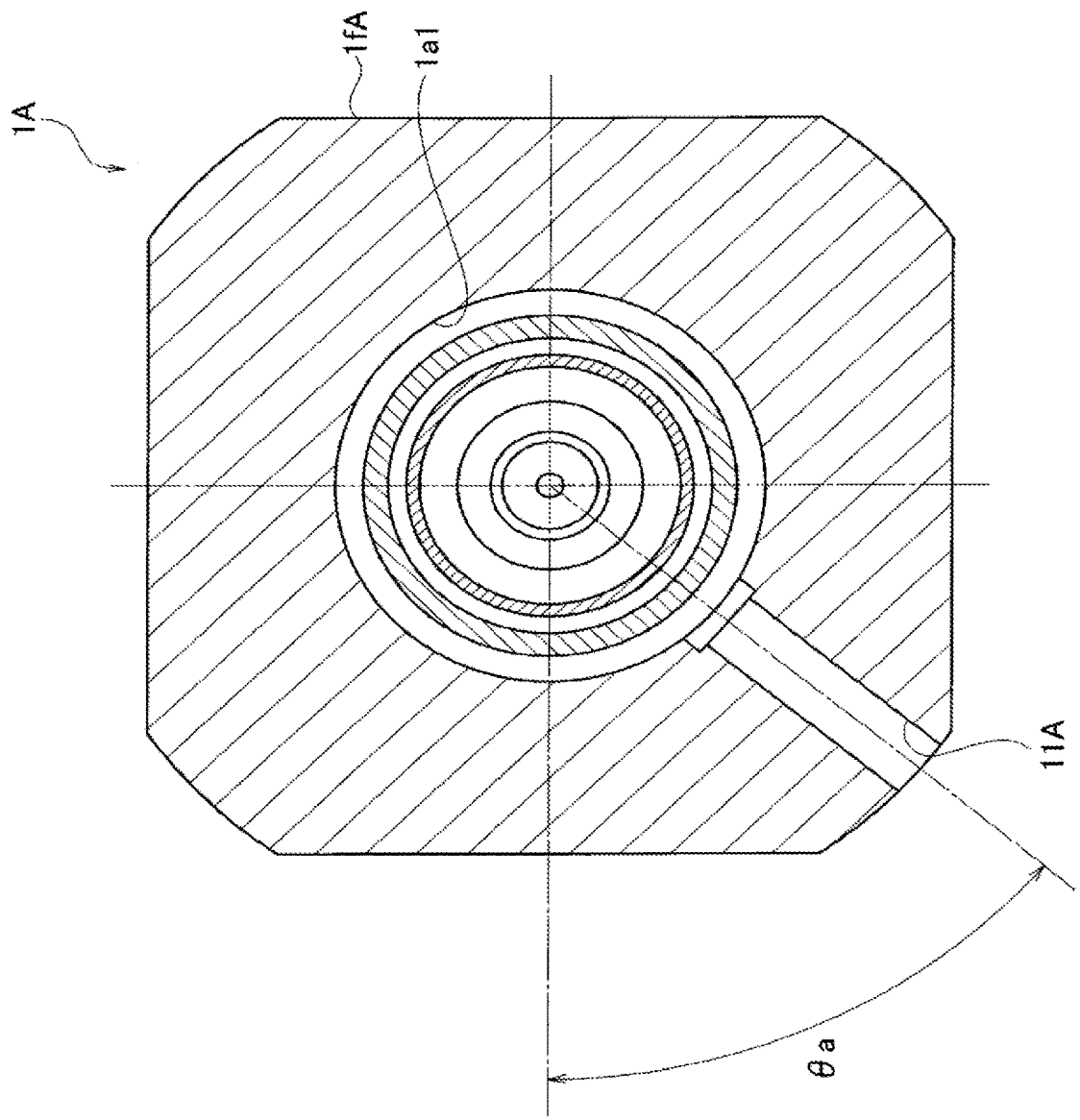
FIG. 6 is a cross-sectional view corresponding to FIG. 4, and a view showing a laser processing head 1A that is a comparative example of the laser processing head 1.

FIG. 6 is a view to be compared to FIG. 4, and a view showing a cross-sectional shape in a flange part 1fA of a laser processing head 1A that is a comparative example to the laser processing head 1. As shown in FIG. 6, the laser processing head 1A of the comparative example includes a gas supply hole 11A corresponding to the gas supply hole 11 in the laser processing head 1 of the implementation example, and does not include a gas supply hole corresponding to the gas supply hole 12 in the laser processing head 1. That is, an assist gas AG supplied from outside flows through the gas supply hole 11A that is one supply path into the laser processing head 1A.

Figure 7:
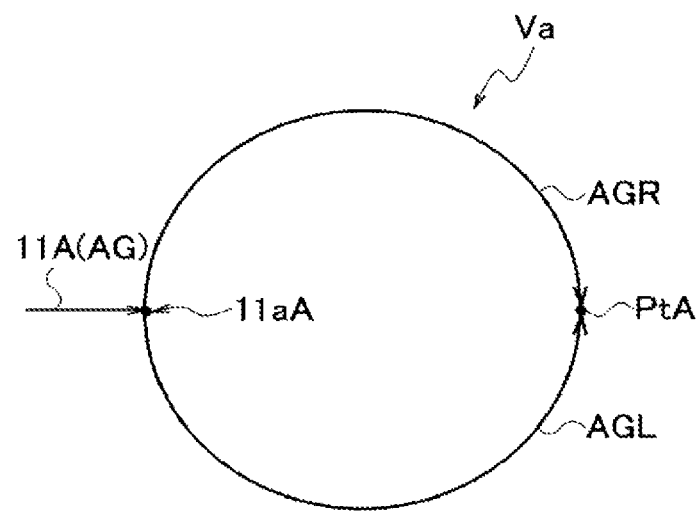
FIG. 7 is a schematic view showing flow of an assist gas AG supplied to the laser processing head 1A.

FIG. 7 is a view to be compared to FIG. 5, and a schematic view showing flow of the assist gas AG in the laser processing head 1A of the comparative example. As shown in FIG. 7, in the laser processing head 1A, the assist gas AG passes through one gas supply hole 11A and is supplied from an inflow point 11aA to a space Va. On flowing into the space Va, the assist gas AG branches to gas flow AGR that is clockwise flow and gas flow AGL that is counterclockwise flow.

The gas flow AGR and gas flow AGL collide only at one point of a collision point PtA where flow distances from the inflow point 11aA in the space Va are the same and which is opposite to the inflow point. That is, the assist gas AG collides at two collision points Pt1 and Pt2 in the space Va in the laser processing head 1 of the implementation example, and collides at one collision point PtA in the space Va of the laser processing head 1A in the comparative example.

When the flow of the assist gas AG in the space Va of the laser processing head 1 is compared to that of the laser processing head 1A, two collision points Pt1 and Pt2 are generated in the laser processing head 1, and at the respective collision points Pt1 and Pt2, a pressure rises and the flow is disturbed. In this case, however, the pressure rise and flow disturbance are suppressed more than in a case where the gas flow collides at one collision point PtA as in the laser processing head 1A. Also, the flow disturbance of the assist gas AG at the collision points Pt1 and Pt2 generated in the space Va of the laser processing head 1 propagates as the flow disturbance in the circumferential direction also to the flow of the assist gas AG flowing through the space Vb into the hole 1a1. However, this disturbance in the circumferential direction is suppressed to be smaller than disturbance of the flow of the assist gas AG in the circumferential direction in the hole 1a1 of the laser processing head 1A.

Also, in the laser processing head 1, respective axes C11 and C12 of two gas supply holes 11 and 12 are not on a straight line in top view from an axis CL1 direction and, for example, the angle θa is set to 50° and the angle θb is set to 43°. That is, the gas supply holes 11 and 12 are arranged shifted from a position to divide the space Va into two equal parts in the circumferential direction. Consequently, positions in the circumferential direction and gas flow disturbance degrees at two collision points Pt1 and Pt2 are not steady, and the gas flow disturbance is averaged and suppressed more while shifting from the circumferential position, in a process of entering from the space Va through the space Vb into the hole 1a1.

That is, the laser processing head 1 includes two gas supply holes 11 and 12 as part of the gas supply part GK of the assist gas AG, and the two gas supply holes 11 and 12 are arranged at the positions where the cross-sectional shape is not evenly divided in the circumferential direction. The assist gas AG flowing from the two gas supply holes 11 and 12 into the space Va functioning as air reservoir collides at two collision points Pt1 and Pt2 to cause the flow disturbance. However, since the collision points Pt1 and Pt2 are arranged at the positions that are not evenly divided in the circumferential direction, the assist gas AG flows into the space Vb in a state where the flow disturbance does not become steady. Consequently, the flow disturbance of the assist gas AG is gradually suppressed in a process of passing through the space Va and the space Vb, and the assist gas AG flows into the hole 1a1 in a state where the flow is averaged in the circumferential direction.

As described above, distribution of circumferential flow of the assist gas AG injected from the laser processing head 1 including two gas supply holes 11 and 12 is disturbed less and uniformized more than that of circumferential flow of the assist gas AG injected from the laser processing head 1A only including one gas supply hole 11A.

Next, description will be made as to a difference between the flow of the assist gas AG blown from the laser processing head 1 of the implementation example and the flow of the assist gas AG blown from the laser processing head 1A of the comparative example, because the difference was confirmed by experiment A and experiment B.

In the experiment A, pressure distribution of the assist gas AG blown from each of the laser processing heads 1 and 1A was measured in horizontally orthogonal biaxial directions, presence of disturbance was checked, and disturbances were compared. In the experiment B, a height of dross generated in each side of the workpiece W substantially cut along a substantially rectangular cutting path Ct was measured, and maximum values were compared. Hereinafter, each maximum value of the height of the dross in the cutting path Ct will be referred to also as a dross highest value Dd.

(Regarding Method of Experiment A)

Figure 8A:
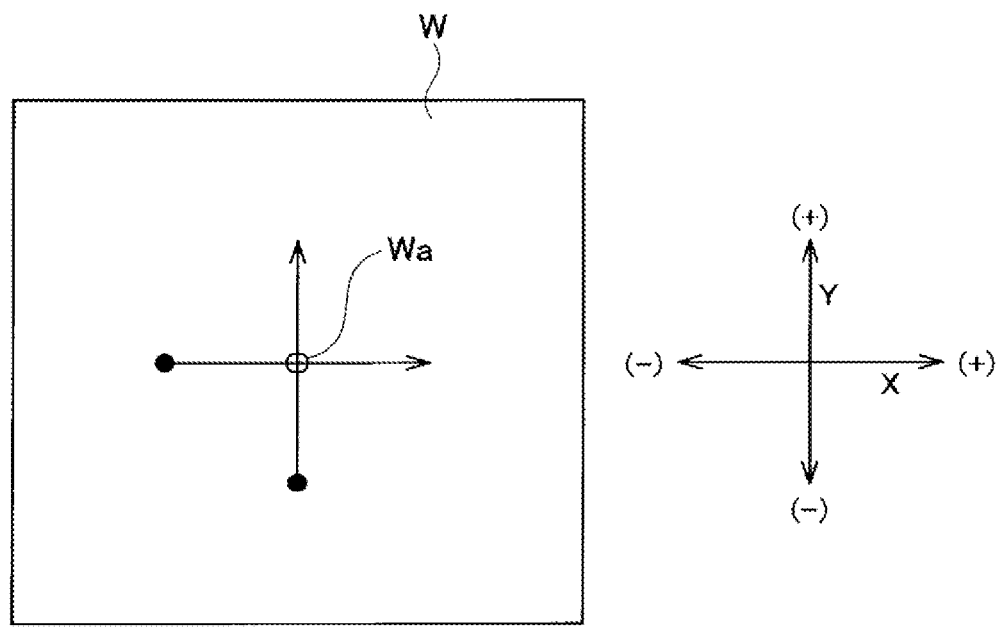
FIG. 8A is a schematic plan view showing a moving direction of the laser processing head 1 in pressure distribution measurement of the assist gas AG.
Figure 8B:
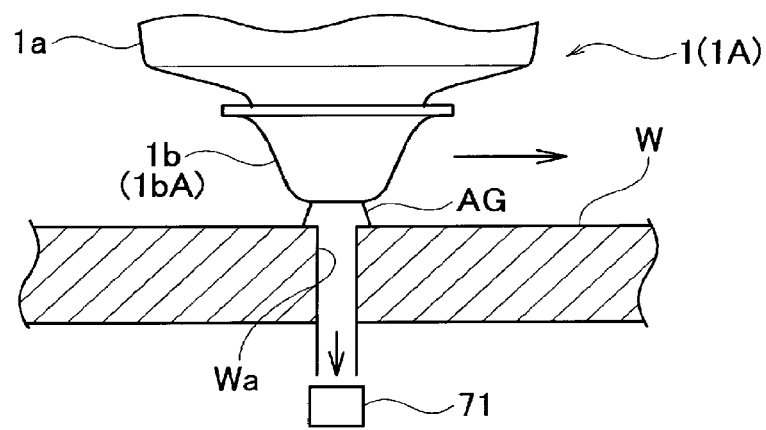
FIG. 8B is a side view of a partial cross section for explaining a pressure distribution measuring method.

A method of the experiment A will be described with reference to FIGS. 8A and 8B. FIG. 8A is a top view of the workpiece W cut in the experiment A, and FIG. 8B is a side view of a partial cross section of the workpiece W and the laser processing head 1 during performing of the experiment A.

A through hole Wa is formed in the workpiece W of a plate material in advance, and a pressure gauge 71 is disposed directly below the through hole Wa. Relative to the workpiece W, each of the laser processing heads 1 and 1A is moved along an X-axis and a Y-axis that are two horizontally orthogonal axes passing through the through hole Wa, while blowing the assist gas AG, and the assist gas AG passing through the through hole Wa and blown on a lower surface side has change in pressure over time that is measured with the pressure gauge 71. Consequently, the pressure distributions of the blown assist gas AG in the X-axis and Y-axis directions are obtainable independently as to the laser processing heads 1 and 1A. A diameter of the through hole Wa is set to 1.0 mm, and a measurement range is a range of 4 mm in total including 2.0 mm in front and rear in a moving direction from a center position of each of nozzles 1b and 1bA of the laser processing heads 1 and 1A.

(Regarding Method of Experiment B)

Figure 9:
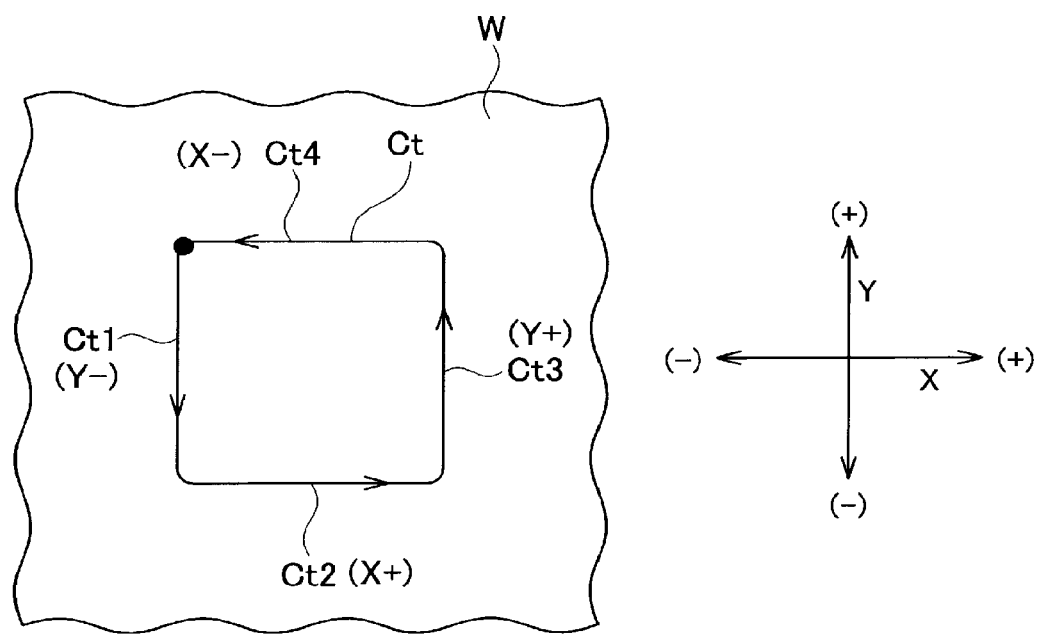
FIG. 9 is a schematic plan view showing a cutting path for evaluating cutting directionality of a dross height.

As shown in FIG. 9, a substantially square cutting path Ct with each rounded corner is set to a workpiece W of a plate material. The cutting path Ct is cut in a counterclockwise direction of FIG. 9, that is, a first path Ct1, a second path Ct2, a third path Ct3 and a fourth path Ct4 that are four paths as linear portions are cut in this order, and a dross highest value Dd that is a maximum value of a height of dross generated in each path is measured. Orientations of X and Y-cutting directions are set as shown with (+) and (−) in FIG. 9. That is, the first path Ct1 to the fourth path Ct4 are, in the cutting order, the first path Ct1: (Y−) direction, the second path Ct2: (X+) direction, the third path Ct3: (Y+) direction, and the fourth path Ct4: (X−) direction. Also, in the cutting, a focus position of a laser beam Ls was changed in three stages, a moving velocity was changed in four stages, and each dross highest value Dd was measured.

(Results in Laser Processing Head 1 of Implementation Example)

Experiment A

Figure 10:
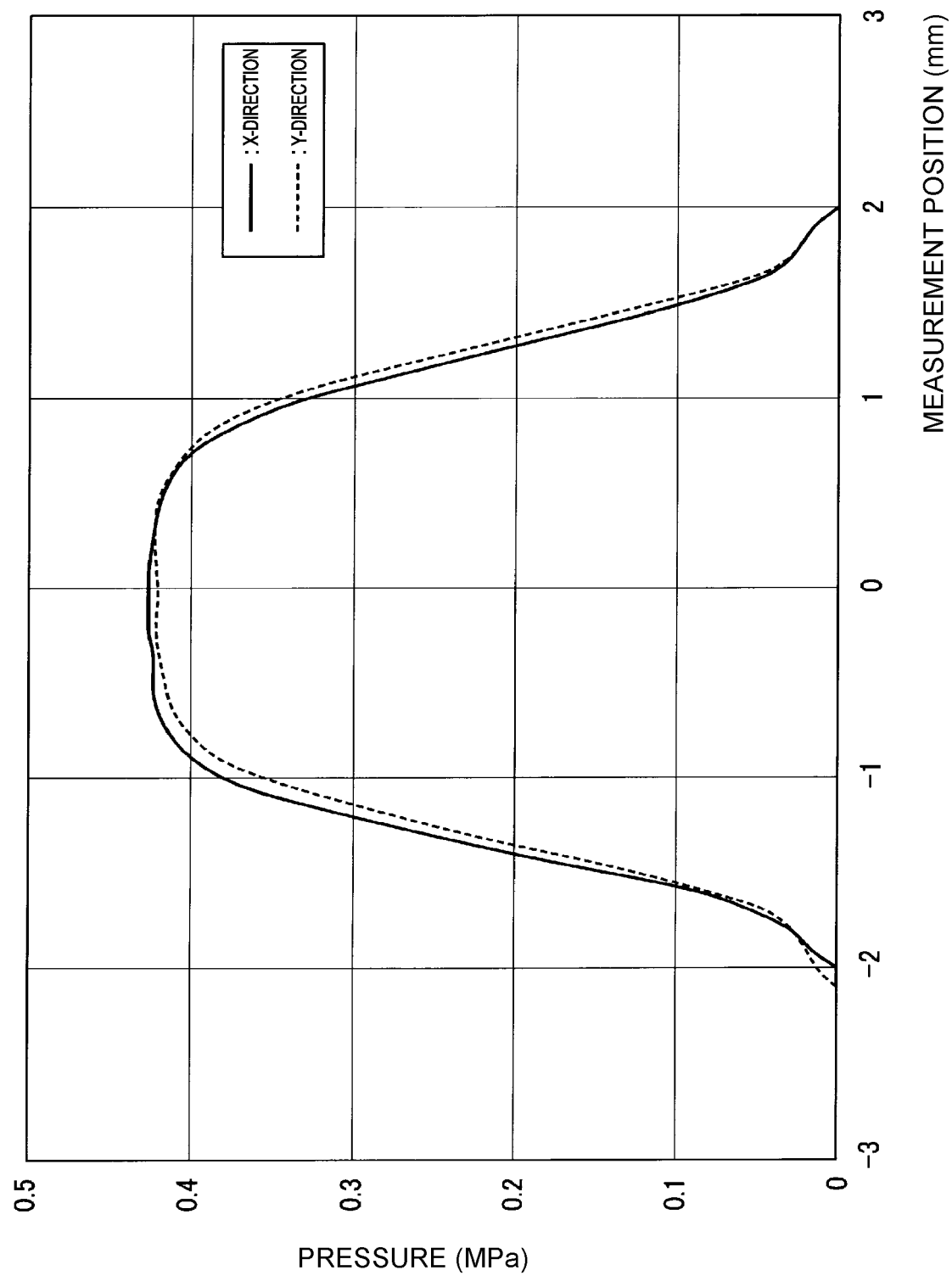
FIG. 10 is a graph showing a pressure distribution measurement result of the assist gas AG in the laser processing head 1.

FIG. 10 shows the results of the experiment A in the laser processing head 1 of the implementation example. As shown in FIG. 10, blowing pressure distributions of the assist gas AG in the laser processing head 1 have a smooth pressure change degree, and substantially match with each other in an X-axis direction and a Y-axis direction, and any substantial differences depending on a cutting direction are not recognized. That is, it is seen that the pressure distribution of the assist gas AG blown from the laser processing head 1 is uniform in a circumferential direction.

Experiment B

FIG. 11 is a table showing the results of the experiment B in the laser processing head 1 of the implementation example. In this table, the dross highest value Dd is divided into four stages depending on a size, and cells in the table are classified with hatching or the like. As shown in FIG. 11, in the laser processing head 1, at focus positions of −2.0 mm and −3.0 mm, the dross highest value Dd is suppressed to a minimum stage equal to or less than 30 μm in the four stages regardless of a moving velocity. Also, at a focus position of −0.5 mm, the dross highest value Dd is suppressed to be equal to or less than 50 μm. At any focus position, any noticeable tendencies or differences due to differences among the first path Ct1 to the fourth path Ct4 are not recognized. That is, any cutting directionality is not recognized in dross highest value Dd.

(Comparative Example: Results of Laser Processing Head 1A)

Experiment A

Figure 12:
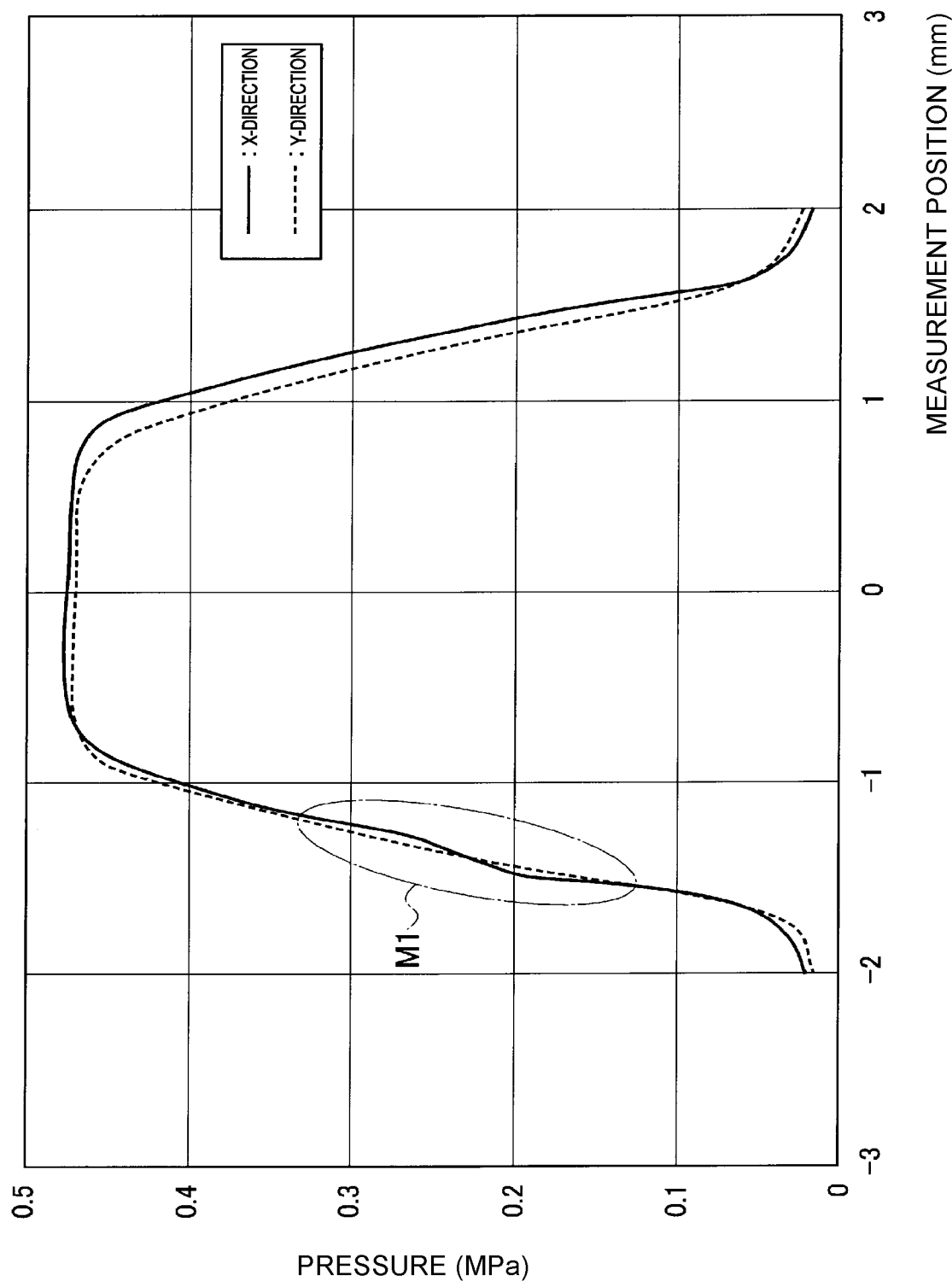
FIG. 12 is a graph showing a pressure distribution measurement result of the assist gas AG in the laser processing head 1A of the comparative example.

FIG. 12 shows the results of the experiment A in the laser processing head 1A of the comparative example. As shown in FIG. 12, it is seen that in a blowing pressure distribution of an assist gas AG in the laser processing head 1A, undulated disturbance in an S-shape occurs in a measurement range Ml from −2 mm to −1 mm in movement in an X-direction shown with a solid line. It is also seen that a pressure difference is noticeably made between the X-direction and a Y-direction in a measurement position range from (+0.5) to (+1.6). Consequently, it is seen that the pressure distribution of the assist gas AG blown from the laser processing head 1A is not uniform in a circumferential direction.

Experiment B

FIG. 13 is a table showing the results of the experiment B in the laser processing head 1A of the comparative example, and can be compared to FIG. 11. As shown in FIG. 13, in the laser processing head 1A, a dross highest value Dd is often in excess of 30 μm, and sometimes in excess of 50 μm regardless of a focus position and moving velocity, and it is recognized that the dross highest value tends to be higher than in a case where the laser processing head 1 of the implementation example is used. Also, it is recognized that in cutting in an X-axis direction including cutting of a second path Ct2 in a (X+) direction and a fourth path Ct4 in a (X−) direction, the dross highest value Dd tends to be higher regardless of the focus position and moving velocity than in cutting in a Y-axis direction including cutting of a first path Ct1 in a (Y−) direction and a third path Ct3 in a (Y+) direction. Thus, the cutting by use of the laser processing head 1A of the comparative example has a large dross highest value Dd and cutting directionality. For this result, it is presumed that there is a factor that a pressure distribution of an assist gas AG is not uniform in a circumferential direction as revealed in the experiment A.

It is seen from the above results that according to the laser processing head 1 and the laser processing machine 61 including the laser processing head 1, the pressure distribution of the assist gas AG blown from the laser processing head 1 is uniform in the circumferential direction, and the cutting directionality is hard to occur in the dross height.

The embodiment of the present invention is not limited to the above configuration, and may be modified without departing from the scope of the present invention.

Figure 14:
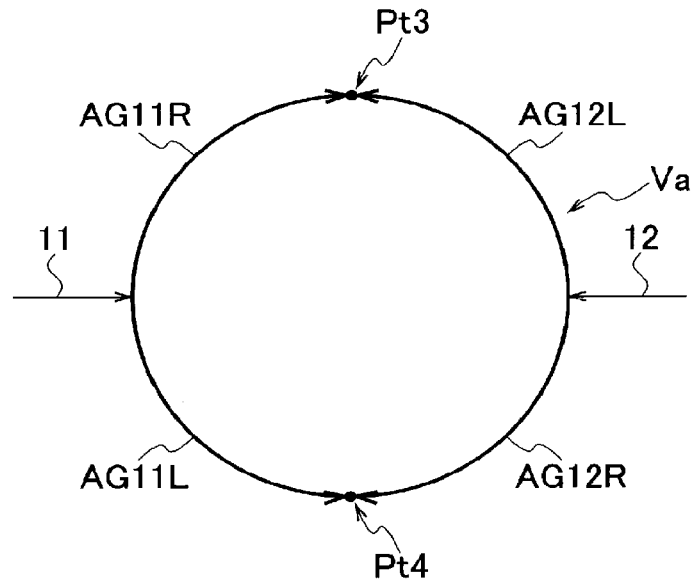
FIG. 14 is a schematic view showing flow of an assist gas AG in a first modification of the laser processing head 1.

As shown in FIG. 14, in a first modification of the laser processing head 1, two gas supply holes 11 and 12 may be formed on a straight line. In this case, flow disturbances of the assist gas AG that are generated at collision points Pt3 and Pt4 comparatively stably propagate to the space Vb, but increase in pressure value in a portion disturbed more than in the laser processing head 1A is suppressed to be small.

Figure 15:
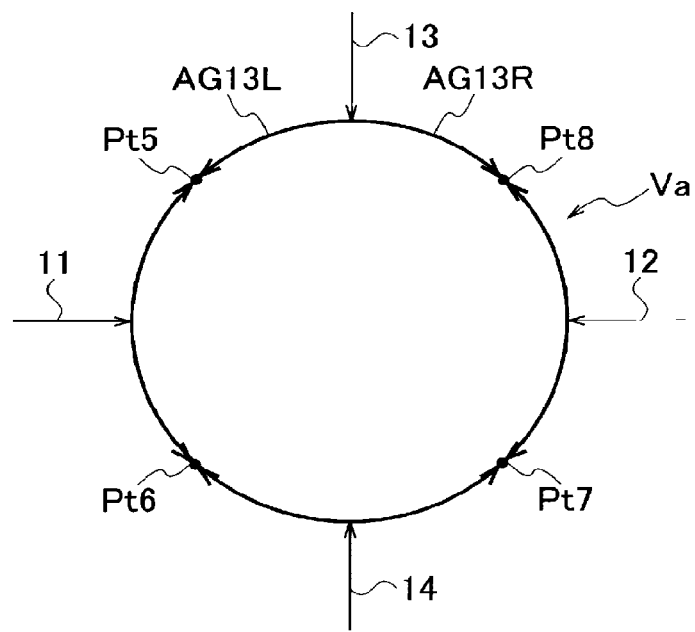
FIG. 15 is a schematic view showing flow of an assist gas AG in a second modification of the laser processing head 1.

As shown in FIG. 15, the laser processing head 1 is not limited to the one including two gas supply holes 11 and 12. For example, in a second modification, the laser processing head 1 may include n (integer equal to or more than 3) gas supply holes shifted from each other around the axis CL1 and formed along an axis orthogonal to the axis CL1. FIG. 15 shows the second modification including four gas supply holes 11 to 14 and four collision points Pt5 to Pt8 generated in flow of the assist gas AG. The laser processing head 1 preferably includes more collision points, because increase in pressure value at each collision point is more suppressed and lowered. Further, in this case, at least one of the n gas supply holes preferably has different angle pitches with two adjacent gas supply holes around the axis CL1, because circumferential disturbance of flow of a gas flowing through the internal space Vc is more suppressed.

When burr or the like in hole making is generated in edges of portions of the gas supply holes 11 and 12 that open at the inner circumferential surface 1a2 of the hole 1a1, the flow of the assist gas AG might be disturbed. Therefore, to remove the generated burr, so-called thread chamfering may be performed, or opening processed portions 11c and 12c subjected to chamfering, counter boring or the like may be formed as shown in FIG. 3. In particular, the opening processed portions 11c and 12c are formed, so that pressure loss and flow disturbance of the assist gas AG in the gas supply holes 11 and 12 can be suppressed. Thus, the forming of the opening processed portions 11c and 12c substantially corresponds to increasing of inner diameters of the gas supply holes 11 and 12, and variances in pressure loss and flow disturbance in two supply paths can be suppressed, so that uniformizing of the circumferential pressure distribution of the assist gas AG blown from the laser processing head 1 can be promoted.

It has been described in the embodiment that both the axis C11 and the axis C12 of the gas supply hole 11 and the gas supply hole 12 also spatially cross the axis CL1 of the main body 1a at right angles on the plane orthogonal to the axis. The present invention is not limited to this embodiment, one or both of the respective axes C11 and C12 of the gas supply holes 11 and 12 may be formed shifted in a horizontal direction not to cross the axis CL1 on the plane orthogonal to the axis CL1. In this case, a range in which the axis of the gas supply hole is permitted to shift is, for example, a range between positions where radius lines tilted at +30° and −30° relative to the axis C11 shown in FIG. 4 cross the inner circumferential surface 1a2, in a case where the shifted axis is the C11. When the gas supply hole is opened so that the axis is in this range, a collision point similar to that of the embodiment is generated between openings of a plurality of gas supply holes, and effects of suppressing pressure rise and flow disturbance can be obtained in the same manner as in the embodiment.

The respective axes C11 and C12 of two gas supply holes 11 and 12 in the laser processing head 1 do not have to be at the same positions in the axial direction in which the axis CL1 extends, and may be formed at shifted positions. For example, in the second modification, at least one of three or more gas supply holes may be formed to have an axis at a position in the axial direction that is different from a position of the other gas supply hole. In this case, a gas supply path may be formed at the position in the axial direction in which the axis CL1 extends, to open to the cylindrical space Va between the inner circumferential surface 1a2 of the main body 1a and the outer circumferential surface 1d1a of the flow path forming ring 1d. Consequently, a point at which the flow is disturbed is harder to be steady in a process in which the assist gas AG flows from the space Va to the space Vb, and the circumferential pressure distribution of the assist gas AG blown from the laser processing head 1 is more uniformized.

REFERENCE SIGNS LIST 1 laser processing head
1a main body
1a1 hole
1a2 inner circumferential surface
1b nozzle
1b1 opening
1c flow path adapter
1c1 peripheral wall portion
1c1a outer circumferential surface
1d flow path forming ring
1d1 peripheral wall portion
1d1a outer circumferential surface
1d1b inner circumferential surface
1e focusing lens
1f flange part
1f1 and 1f2 corner
1f3 to 1f6 edge
1g protective glass
11 gas supply hole
11a inflow point
11c opening processed portion
12 gas supply hole
12a inflow point
12c opening processed portion
4 fiber cable
71 pressure gauge
8, 8a and 8b hose
9 branch part
61 laser processing machine
62 laser oscillation device
63 processing main body
63a table
63b X-axis carriage
63c Y-axis carriage
63d Z-axis holder
64 NC device 65 assist gas supply device
AG assist gas
AG11L, AG11R, AG12L and AG12R gas flow
CL1 axis
Ct cutting path
Ct1 first path
Ct2 second path
Ct3 third path
Ct4 fourth path
C11 and C12 axis
C3 center line
da and db distance
Dd dross highest value
D11 and D12 inner diameter
GK gas supply part
Pt1 to Pt8 collision point
P1 and P2 gas supply port
Ls laser beam
Va and Vb space
Vc internal space
W workpiece
Wa through hole
θa and θb angle

The invention claimed is:

1. A laser processing head comprising:
a tubular main body; and
a gas supply part disposed in the main body and allowing an assist gas supplied from outside to flow into an internal space of the main body, wherein the gas supply part includes:
a flow path forming ring, and
two gas supply holes including:
a first gas supply hole extending along a first axis on a plane orthogonal to an axis of a tube of the main body and opening at an inner circumferential surface of the main body; and
a second gas supply hole forming an angle other than 180° relative to the first axis around the axis, extending along a second axis on the plane orthogonal to the axis and opening at the inner circumferential surface;
wherein the flow path forming ring faces the inner circumferential surface with a predetermined interval, and forms a cylindrical space extending along the axis between the flow path forming ring and the inner circumferential surface.

2. A laser processing machine comprising:
the laser processing head according to claim 1;
a laser oscillation device configured to supply a laser beam to the laser processing head;
an assist gas supply device configured to supply an assist gas to the first gas supply hole and the second gas supply hole; and
a moving device configured to move the laser processing head relative to a workpiece.

3. The laser processing machine according to claim 2, wherein an assist gas with the same pressure is supplied to the first gas supply hole and the second gas supply hole.

4. The laser processing machine according to claim 1, wherein the cylindrical space extends along and in parallel with the axis of the tube.

5. The laser processing machine according to claim 1, wherein:
the first axis crosses the axis of the tube, and
the second axis crosses the axis of the tube.

* * * * *